US012774663B1

(12) United States Patent
Pabla et al.

(10) Patent No.: US 12,774,663 B1
(45) Date of Patent: Oct. 27, 2026

(54) SYSTEM AND METHOD FOR SURFACE TREATMENT OF SPLINE GEARS

(71) Applicant: GE Vernova Infrastructure Technology LLC, Greenville, SC (US)

(72) Inventors: Surinder Singh Pabla, Greer, SC (US); Jon Conrad Schaffer, Greenville, SC (US); Donald Timothy Lemon, Greenville, SC (US); Richert Arthur Davis, Greenville, SC (US); William McEntaggart, Marietta, GA (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 19/230,074

(22) Filed: Jun. 5, 2025

(51) Int. Cl.

| | |
|---|---|
| ***F01D 15/12*** | (2006.01) |
| ***B23K 26/356*** | (2014.01) |
| ***B24C 1/10*** | (2006.01) |
| ***F16H 55/06*** | (2006.01) |

(52) U.S. Cl.
CPC ........... *F01D 15/12* (2013.01); *B23K 26/356* (2015.10); *B24C 1/10* (2013.01); *F16H 55/06* (2013.01); *F05D 2230/90* (2013.01); *F05D 2260/4031* (2013.01); *F05D 2300/70* (2013.01)

(58) Field of Classification Search
CPC ... F01D 15/12; F05D 2260/4031; F16H 55/06
See application file for complete search history.

(56) References Cited

U.S. PATENT DOCUMENTS

| | | | | |
|---|---|---|---|---|
| 10,859,000 | B2 * | 12/2020 | Kubiak | F16H 57/082 |
| 12,060,802 | B1 | 8/2024 | Park et al. | |
| 2024/0075587 | A1 * | 3/2024 | Rawson | F02C 7/36 |

FOREIGN PATENT DOCUMENTS

| | | |
|---|---|---|
| GB | 2053744 B | 2/1981 |

OTHER PUBLICATIONS

Internet print-out of https://www.engineeringtoolbox.com/friction-coefficients-d_778.html (Year: 2025).*

* cited by examiner

*Primary Examiner* — Christopher R Legendre
(74) *Attorney, Agent, or Firm* — Fletcher Yoder, P.C.

(57) ABSTRACT

A system includes a turbine and a spline gear coupled to the turbine. The spline gear includes first and second gear portions. The first gear portion includes a first surface configured to engage a second surface of the second gear portion. The first surface includes a first roughened surface having a plurality of first treatment zones distributed in two dimensions. A post-treatment coefficient of friction (COF) between the first and second surfaces is less than a threshold COF value.

20 Claims, 4 Drawing Sheets

SYSTEM AND METHOD FOR SURFACE TREATMENT OF SPLINE GEARS

BACKGROUND

The present application relates generally to a system and method for manufacturing a mechanical spline gear associated with a gas turbine system.

An industrial plant may include a gas turbine system and a steam turbine system. The gas turbine system may mechanically interact with the steam turbine system via one or more spline gears. Unfortunately, friction between gear portions may lead to wear and/or galling of the spline gear and, in certain embodiments, generation of excessively large loads on the spline gear and other components. Accordingly, a system and method for reducing the amount of friction between the gear portions is desired.

BRIEF DESCRIPTION

Certain embodiments commensurate in scope with the originally claimed subject matter are summarized below. These embodiments are not intended to limit the scope of the claimed embodiments, but rather these embodiments are intended only to provide a brief summary of possible forms of the subject matter. Indeed, the presently claimed embodiments may encompass a variety of forms that may be similar to or different from the embodiments set forth below.

In certain embodiments, a system includes a turbine and a spline gear coupled to the turbine. The spline gear includes first and second gear portions. The first gear portion includes a first surface configured to engage a second surface of the second gear portion. The first surface includes a first roughened surface having a plurality of first treatment zones distributed in two dimensions. A post-treatment coefficient of friction (COF) between the first and second surfaces is less than a threshold COF value.

In certain embodiments, a system includes a spline gear. The spline gear includes a first gear portion and a second gear portion configured to engage the first gear portion. The first gear portion includes a first surface configured to engage a second surface of the second gear portion. The first surface includes a first roughened surface having a plurality of first treatment zones distributed in two dimensions. A post-treatment coefficient of friction (COF) between the first and second surfaces is less than a threshold COF value.

In certain embodiments, a method includes applying a first roughening treatment to a first surface of a first gear portion of a spline gear to form a first roughened surface. The first surface of the first gear portion is configured to engage a second surface of a second gear portion of the spline gear. The first roughened surface includes a plurality of first treatment zones distributed in two dimensions. A post-treatment coefficient of friction (COF) between the first and second surfaces is less than a threshold COF value.

BRIEF DESCRIPTION OF THE DRAWINGS

These and other features, aspects, and advantages of the presently disclosed techniques will become better understood when the following detailed description is read with reference to the accompanying drawings in which like characters represent like parts throughout the drawings, wherein.

DETAILED DESCRIPTION

Figure 1:
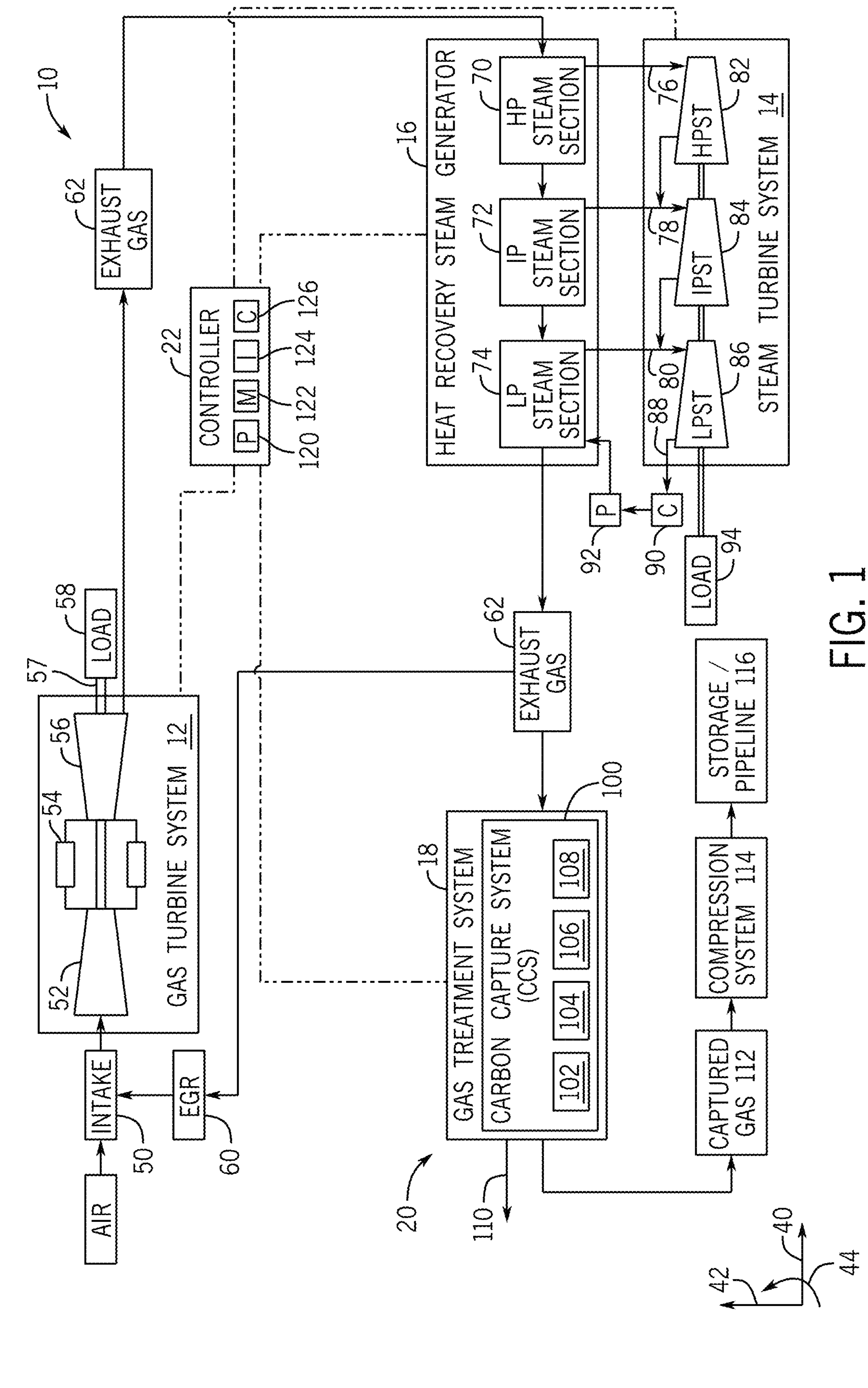
FIG. 1 is a block diagram of an embodiment of a combined cycle system having a spline gear between rotary machines.

One or more specific embodiments of the presently disclosed systems and methods are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the presently disclosed embodiments, the articles "a," "an," "the," and "said" are intended to mean that there are one or more of the elements. The terms "comprising," "including," and "having" are intended to be inclusive and mean that there may be additional elements other than the listed elements.

The present disclosure is generally related to a system having a spline gear having gear portions manufactured to reduce friction and increase wear resistance between the gear portions during operation. The system disclosed herein includes a spline gear having first and second gear portions configured to engage one another. The first gear portion has a first surface and the second gear portion has a second surface. A roughening treatment is applied to the first and/or second surfaces, such that a coefficient of friction (COF) is uniform along each direction on the first and second surfaces. The coefficient of friction is a non-dimensional value equal to a ratio of the force of friction between bodies and the force pressing them together. For example, a rougher surface generally has a higher COF, whereas a smoother surface generally has a lower COF. However, the roughening treatment may create a pattern of recesses that reduce the contact area, and thus reduce the COF. Additionally, the roughening treatment can improve the wear resistance on the first and second surfaces, which can result in a lower COF during sliding contact. The roughening treatment may include shot peening, laser shock peening (or laser shot peening), or a combination thereof. The roughening treatment results in a coefficient of friction being less than a threshold coefficient of friction. As disclosed herein, a surface treatment is applied to the first and/or second surfaces. The surface treatment may include nitriding, carburizing, carbonitriding, or a combination thereof. Although the present application describes use of the roughening treatment and the surface treatment for spline gears, the disclosed embodiments may be used for any rotary parts, gears, clutches, sliding interfaces, or interfaces experiencing movements between parts of rotary machines, such as turbomachinery (e.g., gas turbines, compressors, pumps, etc.).

With the foregoing in mind, FIG. 1 is a block diagram of an embodiment of a combined cycle system 10 having a gas turbine system 12, a steam turbine system 14, a heat recovery steam generator (HRSG) 16, a gas treatment system 18 having one or more gas capture systems 20, and a controller 22 coupled to each of the systems 12, 14, 16, and 18. As discussed below, the one or more gas capture systems 20 of the gas treatment system 18 are configured to capture an undesirable gas (e.g., $CO_2$) from exhaust gas and/or air (e.g., direct air capture). As discussed in detail below, one or more components of the combined cycle system 10 includes a roughening treatment and a surface treatment to reduce the coefficient of friction and increase wear resistance of one or more surfaces. For example, the roughening treatment and the surface treatment may be applied to one or more components of the gas turbine system 12, the steam turbine system 14, pumps, compressors, motors, transmissions, clutches, and various rotary machines. The following discussion is intended to provide context of the roughening treatment and the surface treatment for use in the combined cycle system 10; however, the disclosed embodiments may be used in a variety of applications outside of the combined cycle system 10.

Before discussing details of the gas treatment system 18, various aspects of the combined cycle system 10 are discussed in further detail. For purposes of orientation in the drawings, reference may be made to an axial direction or axis 40, a radial direction or axis 42 extending radially away from the axial direction or axis 40, and a circumferential direction or axis 44 extending circumferentially around the axial direction or axis 40. The directions or axes 40, 42, and 44 may be in reference to a rotational axis 36 of the gas turbine system 12, for example.

The gas turbine system 12 includes an air intake 50, a compressor 52 having one or more compressor stages, one or more combustors 54, a turbine 56 having one or more turbine stages, and a load 58 (e.g., electrical generator) driven by the turbine 56. As shown, the gas turbine system 12 also includes a spline gear 57 (e.g., spline clutch). In the illustrated embodiment, the spline gear is coupled to the turbine 56. In certain embodiments, the spline gear 57 may not be coupled to the turbine 56 and/or may be in another portion of the gas turbine system 12. In certain embodiments, the spline gear 57 may be in the steam turbine system 14 and/or coupled to both the gas turbine system 12 and the steam turbine system 14. In certain embodiments, the spline gear 57 may be located between the gas turbine system 12 and the steam turbine system 14. In certain embodiments, the spline gear 57 may include a spline clutch, a flexible coupling, or a combination thereof.

In certain embodiments, the gas turbine system 12 further includes an exhaust gas recirculation (EGR) system 60 configured to recirculate an exhaust gas 62 into the air intake 50. The recirculated exhaust gas 62 helps to reduce the temperature and formation of certain emissions (e.g., nitrogen oxides ($NO_X$)) associated with combustion in the combustors 54. In operation, the compressor 52 receives air (and also exhaust gas 62 if the EGR system 60 is active) from the air intake 50, and compresses the air and/or exhaust gas 62 in one or more compressor stages (e.g., stages of rotating compressor blades). The combustors 54 then combust fuel from a fuel supply system with the compression air and/or exhaust gas, and generate hot combustion gases. The hot combustion gases expand and drive one or more turbine stages (e.g., stages of rotating turbine blades) in the turbine 56, thereby driving rotation of the compressor 52 and the load 58 via shafts. The turbine 56 then outputs the hot combustion gases as the exhaust gas 62.

The HRSG 16 recovers waste heat from the exhaust gas 62 to generate steam for driving the steam turbine system 14. The HRSG 16 includes a high-pressure (HP) steam section 70, an intermediate-steam (IP) section 72, and a low-pressure (LP) steam section 74 configured to generate HP steam 76, IP steam 78, and LP steam 80. The steam turbine system 14 may include an HP steam turbine 82 driven by the HP steam 76, an IP steam turbine 84 driven by the IP steam 78, and a LP steam turbine 86 driven by the LP steam 80. In addition to the steam provided by the HRSG 16, the HP steam turbine 82 provides IP steam to the IP steam turbine 84, and the IP steam turbine 84 provides LP steam to the LP steam turbine 86. The LP steam turbine 86 then outputs any remaining steam/water to a condensate line 88 coupled to the LP steam section 74 of the HRSG 16. The condensate line 88 may include a condenser 90 configured to condense any remaining steam to form a condensate, and a pump 92 configured to pump the condensate back to the LP steam section 74. In operation, the steam turbine system 14 drives a load 94 (e.g., electrical generator) via a shaft. In certain embodiments, the steam turbine system 14 and/or the HRSG 16 may provide heated water and/or steam (e.g., HP steam 76, IP steam 78, and/or LP steam 80) to the gas treatment system 18 to support a desorption mode of the one or more gas capture systems 20. For example, the gas capture systems 20 may receive heated water and/or steam in a temperature range of 100 to 150 degrees Celsius, 110 to 150 degrees Celsius, 120 to 150 degrees Celsius, or 130 to 150 degrees Celsius.

After the HRSG 16, the exhaust gas 62 may flow to the EGR system 60 and/or the gas treatment system 18. In the illustrated embodiment, the exhaust gas 62 flows through one or more gas capture systems 20 configured to capture undesirable gases. The undesirable gases may include carbon oxides ($CO_X$) (e.g., carbon dioxide ($CO_2$) and carbon monoxide (CO)), nitrogen oxides ($NO_X$) (e.g., nitrogen dioxide ($NO_2$)), sulfur oxides ($SO_X$) (e.g., sulfur dioxide ($SO_2$)), or any combination thereof. In the following discussion, $CO_2$ may be used as an example of the undesirable gases; however, the gas capture systems 20 may be designed to capture any of the foregoing undesirable gases. For example, the gas capture systems 20 include one or more carbon capture systems 100 (e.g., $CO_2$ capture systems). The gas capture systems 20 (e.g., carbon capture systems 100) may include sorbent-based gas capture systems, solvent-based gas capture systems, cryogenic gas capture systems, or any combination thereof, configured to remove and capture undesirable gases. The carbon capture system 100 may include components 102, 104, 106, and 108 configured to enable gas capture of undesirable gases (e.g., $CO_2$) from the exhaust gas 62, thereby outputting a treated gas 110 and a captured gas 112 (e.g., $CO_2$). The treated gas 110 may be substantially free of the undesirable gases (e.g., $CO_2$) and may be discharged through an exhaust stack. The captured gas 112 (e.g., $CO_2$) may be compressed by a compression system 114 and stored and/or transported by a storage and/or pipeline system 116.

In certain embodiments, the carbon capture system 100 is a sorbent-based carbon capture system, and the components 102, 104, 106, and/or 108 include multiple sorbent-based carbon capture units (e.g., adsorbers). For example, the sorbent-based carbon capture units may include temperature swing adsorption (TSA) units or adsorbers, wherein a temperature swing or change is used to sequentially operate in an adsorption mode, a desorption mode, and a cooling mode at different temperatures. In the adsorption mode, the adsorber is configured to adsorb undesirable gases (e.g., $CO_2$) into sorbent material at a first temperature. In the desorption mode, the adsorber is configured to desorb the undesirable gases (e.g., $CO_2$) from the sorbent material, for example, by heating the sorbent material from the first temperature to a higher second temperature using a heat source. The heat source may include a heated fluid, such as a heated gas and/or liquid (e.g., steam). In the cooling mode, the adsorber is cooled in preparation for the next adsorption mode.

In certain embodiments, the carbon capture system 100 is a solvent-based carbon capture system, and the components 102, 104, 106, and/or 108 include one or more absorbers, strippers, and associated equipment. For example, the absorber is configured to absorb undesirable gases (e.g., $CO_2$) into a solvent, thereby outputting the treated gas 110 through an exhaust stack and a $CO_2$-rich solvent to the stripper. The stripper is configured to apply heat to the $CO_2$-rich solvent, thereby stripping the undesirable gases (e.g., $CO_2$) from the solvent to produce the captured gas 112 and a $CO_2$-lean solvent. The stripper may receive heat via a heat source, such as a heated gas and/or liquid (e.g., steam). The stripper returns the $CO_2$-lean solvent to the absorber to repeat the cycle.

In the illustrated embodiment, the controller 22 is configured to control all aspects of the combined cycle system 10. The controller 22 includes one or more processors 120, memory 122, instructions 124 stored on the memory 122 and executable by the processor 120, and communication circuitry 126 configured to communicate with sensors and various equipment of the combined cycle system 10. For example, the controller 22 is configured to receive sensor feedback from sensors coupled to the gas turbine system 12, the steam turbine system 14, the HRSG 16, and the gas treatment system 18 (e.g., gas capture systems 20), and control the same equipment based on the sensor feedback, operating modes, user input, computer models, or any combination thereof. The sensors may include temperature sensors, pressure sensors, flow rate sensors, gas composition sensors, or any combination thereof. In certain embodiments, the controller 22 is configured to control operation of the gas capture systems 20 (e.g., carbon capture systems 100), such by controlling modes of operation (e.g., adsorption mode, desorption mode, and cooling mode), controlling heat sources for supplying heated fluid (e.g., steam) to the gas capture systems 20, controlling cooling sources for supply cooled fluids to the gas capture systems 20, or any combination thereof.

Figure 2:
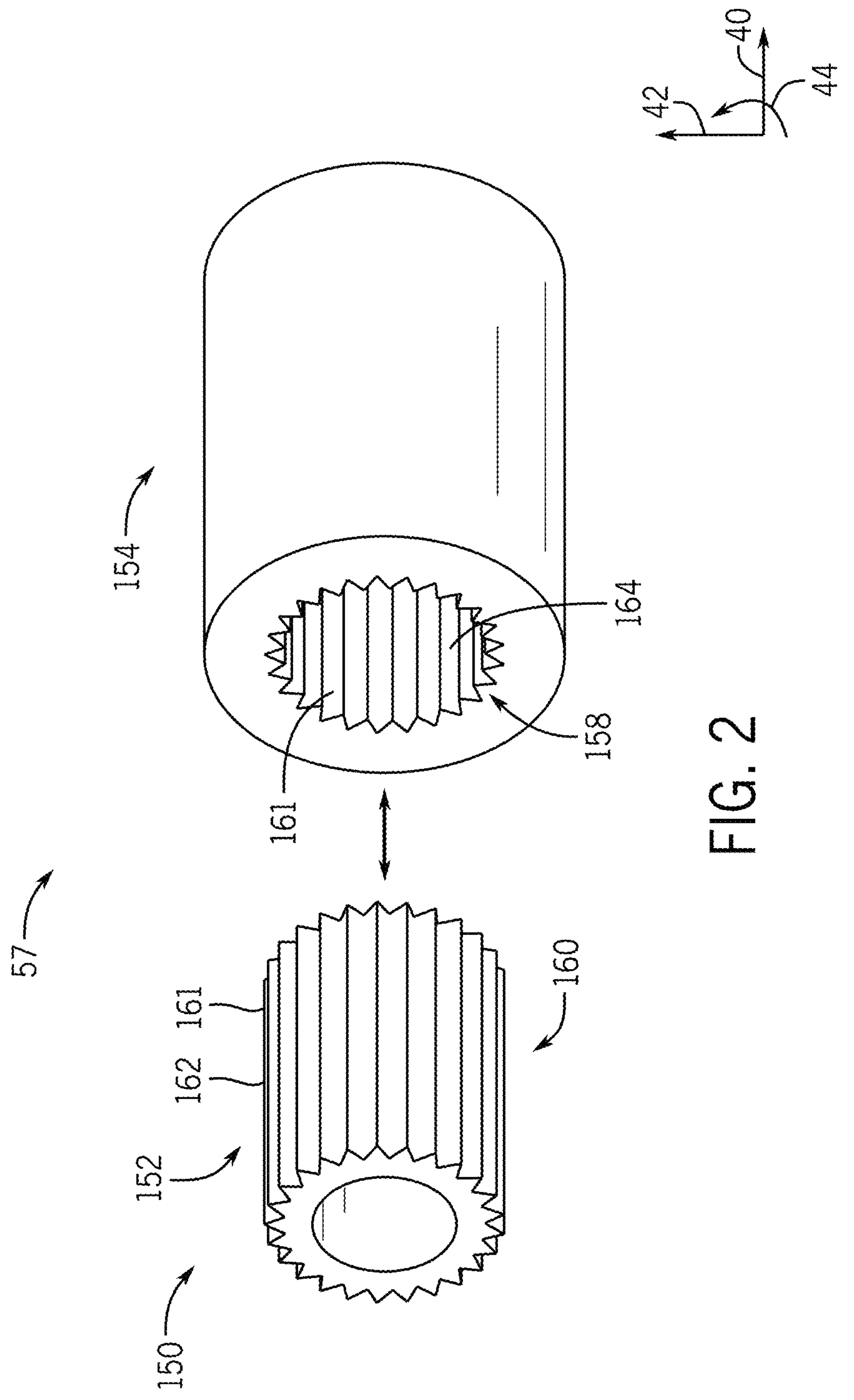
FIG. 2 is a schematic of an embodiment of the spline gear having gear portions.

FIG. 2 is a schematic of an embodiment of the spline gear 57 having gear portions 150 (e.g., inner gear portion 152, outer gear portion 154). As shown, the inner gear portion 152 is configured to engage with the outer gear portion 154, such that the inner gear portion 152 moves relative to the outer gear portion 154 in the axial direction 40. In certain embodiment, the inner gear portion 152 is configured to slide along the outer gear portion 154. The outer gear portion 154 includes a plurality of inner teeth 158 and the inner gear portion 152 includes a plurality of outer teeth 160.

In the illustrated embodiment, the gear portions 150 include surfaces 161. As shown, the inner gear portion 152 includes surfaces 162 (e.g., first roughened surface, first unroughened surface) and the outer gear portion 154 includes surfaces 164 (e.g., second roughened surface, second unroughened surface). In the illustrated embodiment, the surfaces 162 of the inner gear portion 152 engage the surfaces 164 of the outer gear portion 154 when the inner gear portion 152 and the outer gear portion 154 engage with each other. In certain embodiments, the surfaces 162 may include surfaces of the inner gear portion 152 that do not directly engage with the outer gear portion 154. Additionally or alternatively, in certain embodiments, the surfaces 164 may include surfaces of the outer gear portion 154 that do not directly engage with the inner gear portion 152.

As discussed in further detail herein, a first roughness (e.g., COF) of the surfaces 162 is adjusted by applying a first roughening treatment to the surfaces 162. Additionally or alternatively, a second roughness (e.g., COF) of the surfaces 164 is adjusted by applying a second roughening treatment to the surfaces 164. The roughening treatment (e.g., first roughening treatment and/or second roughening treatment) adjusts the COF of the surfaces 162 and the surfaces 164 to be less than a threshold COF value. In certain embodiments, the threshold COF value may fall between 0.1 and 0.3, 0.15 and 0.25, or 0.18 and 0.22. In certain embodiments, the threshold COF value is approximately 0.2. In certain embodiments, a type of the first roughening treatment and a type of the second roughening treatment are the same. For example, the first roughening treatment, the second roughening treatment, or a combination thereof, may include a shot peening treatment, a laser shock peening treatment, grit blasting, plasma transferred arc treatment, or a combination thereof.

In certain embodiments, a shot peening treatment may involve the bombardment of the surfaces 164 with shot (e.g., small spheres). The shot cause the formation of compression zones in the surfaces 164, as discussed herein. In certain embodiments, the shot peening treatment may be controlled to vary the surface roughness of the surfaces 164 by changing a size (e.g., diameter) of the shot, a speed at which the shot hits the surfaces 164, a material of the shot, or a combination thereof.

In certain embodiments, a laser shock peening treatment may involve coating the surfaces 164 with an opaque overlay (e.g., tape) and placing the coated surfaces 164 within a transparent overlay (e.g., water). A laser beam is pulsed and passes through the transparent overlay and is absorbed by the opaque overlay, causing a generation of plasma. The plasma generates a shock wave which plastically deforms the surface, creating compressive residual stresses in the surface. In certain embodiments, the laser shock peening treatment may be controlled by controlling a laser intensity, a size of the laser beam, the number of locations per area at which the laser is directed, or a combination thereof.

In certain embodiments, grit blasting (e.g., sandblasting, abrasive blasting, etc.) may involve the bombardment of the surfaces 164 by particles at a high speed. In certain embodiments, the particles may include sand or a ground metallic compound. In certain embodiments, a plasma transferred arc treatment may involve generating a high energy plasma arc that partially melts the surfaces 164 at a particular location. A metal powder is molten by the plasma and binds to the partially melted surfaces 164.

Figure 3:
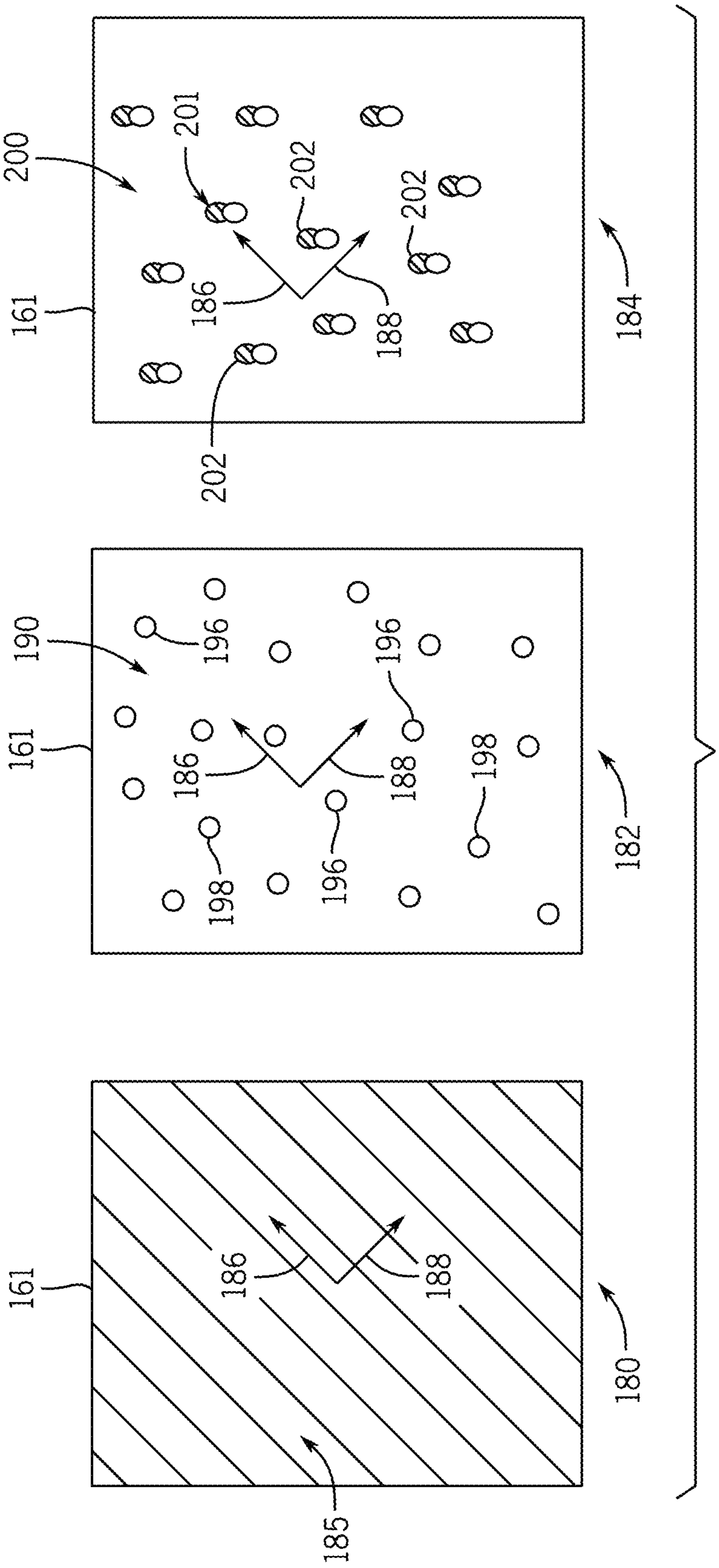
FIG. 3 is a series of closeup views of a surface of one of the gear portions of the spline gear before and after a roughening treatment.

FIG. 3 is a series of closeup views (e.g., views 180, 182, 184) of a surface 161 of one of the gear portions of the spline gear before and after a roughening treatment. In the view 180, the surface 161 (e.g., surfaces 162 and/or surfaces 164) includes a plurality of machining lines 185 (e.g., machining grooves, machining marks, etc.) formed by a tool used for manufacturing the gear portion 150 (e.g., inner gear portion 152 and/or outer gear portion 154). As shown, the machining lines 185 follow a first direction 186. The machining lines 185 result in a coefficient of friction (COF) measured along the first direction 186 that is less than a COF (e.g., coefficient of static friction, coefficient of kinetic friction) measured along a second direction 188 that is orthogonal (e.g., perpendicular, crosswise, etc.) to the first direction 186. As shown in the view 180, prior to the roughening treatment, the surface 161 does not include a plurality of treatment zones in two dimensions formed by a roughening treatment.

In the view 182, the surface 161 includes a plurality of treatment zones, such as compression zones 190 (e.g., first compression zones 192, second compression zones 194) in two dimensions resulting from a roughening treatment applied to the surface 161. The roughening treatment may include shot peening, laser shock peening, grit blasting, laser plasma arc, or a combination thereof. In certain embodiments, the plurality of compression zones 190 may include a plurality of indentations 196 (e.g., dimples, recesses, dips, or the like) formed via shot peening, a plurality of undeformed residual stresses 198 (e.g., compressive residual stress zones or laser shock peening residual stresses formed via laser shock peening), or a combination thereof. For example, if the shot peening uses spherical media, then the indentations 198 may be generally round indentations, such as hemispherical-shaped indentations.

In certain embodiments, the surfaces 162 and 164 may receive the same type of roughening treatment. For example, both the surfaces 162 and 164 may receive a shot peening roughening treatment. In certain embodiments, the surfaces 162 and 164 may receive different types of roughening treatments. For example, the surface 162 may receive a shot peening treatment and the surface 164 may receive a laser shock peening treatment. In certain embodiments, one of the surfaces 162 and 164 may receive a roughening treatment and the other may not receive a roughening treatment.

The view 184 shows an additional or alternative embodiment of the roughened surfaces 161. As shown, the roughening treatment may include a partial hollowing-out of the surfaces 161 to form a spongy surface having a plurality of capillaries 200 (e.g., channels, holes, recesses, etc.). In certain embodiments, cross-sectional area 201 of each of the plurality of capillaries 200 may be sufficiently small such that a lubricant 202 may remain inside the capillaries 200 as the roughened surfaces 161 are rotated due to capillary forces. The COF between the surfaces 162 and 164 may be reduced by applying a lubricant 202 to the spongy surface. The plurality of capillaries 200 may at least partially retain the lubricant 202, which may seep out of the plurality of capillaries 200 overtime, thereby prolonging the lubrication between the surfaces 161.

After receiving the roughening treatment, the COF between the surfaces 162 and 164 (e.g., contacting each other) is less than COF of the surfaces 162 and 164 prior to receiving the roughening treatment. The COF of the surfaces 161 after receiving the roughening treatment is less than a threshold COF value. In certain embodiments, the threshold COF value may fall between 0.1 and 0.3, 0.15 and 0.25, or 0.18 and 0.22. In certain embodiments, the threshold COF value is approximately 0.2.

The surface 161 includes a surface treatment which is applied after the roughening treatment. In certain embodiments, the surface treatment may be applied before the roughening treatment. The surface treatment may include a nitriding treatment, a carburizing treatment, a carbonitriding treatment or a combination thereof. In certain embodiments, the surfaces 162 and 164 may receive the same type of surface treatment. In certain embodiments, the surfaces 162 and 164 may receive different surface treatments. For example, the surfaces 162 may receive a nitriding treatment and the surfaces 164 may receive a carburizing treatment. In certain embodiments, the surfaces 162 may receive a surface treatment and the surfaces 164 may not receive a surface treatment.

Figure 4:
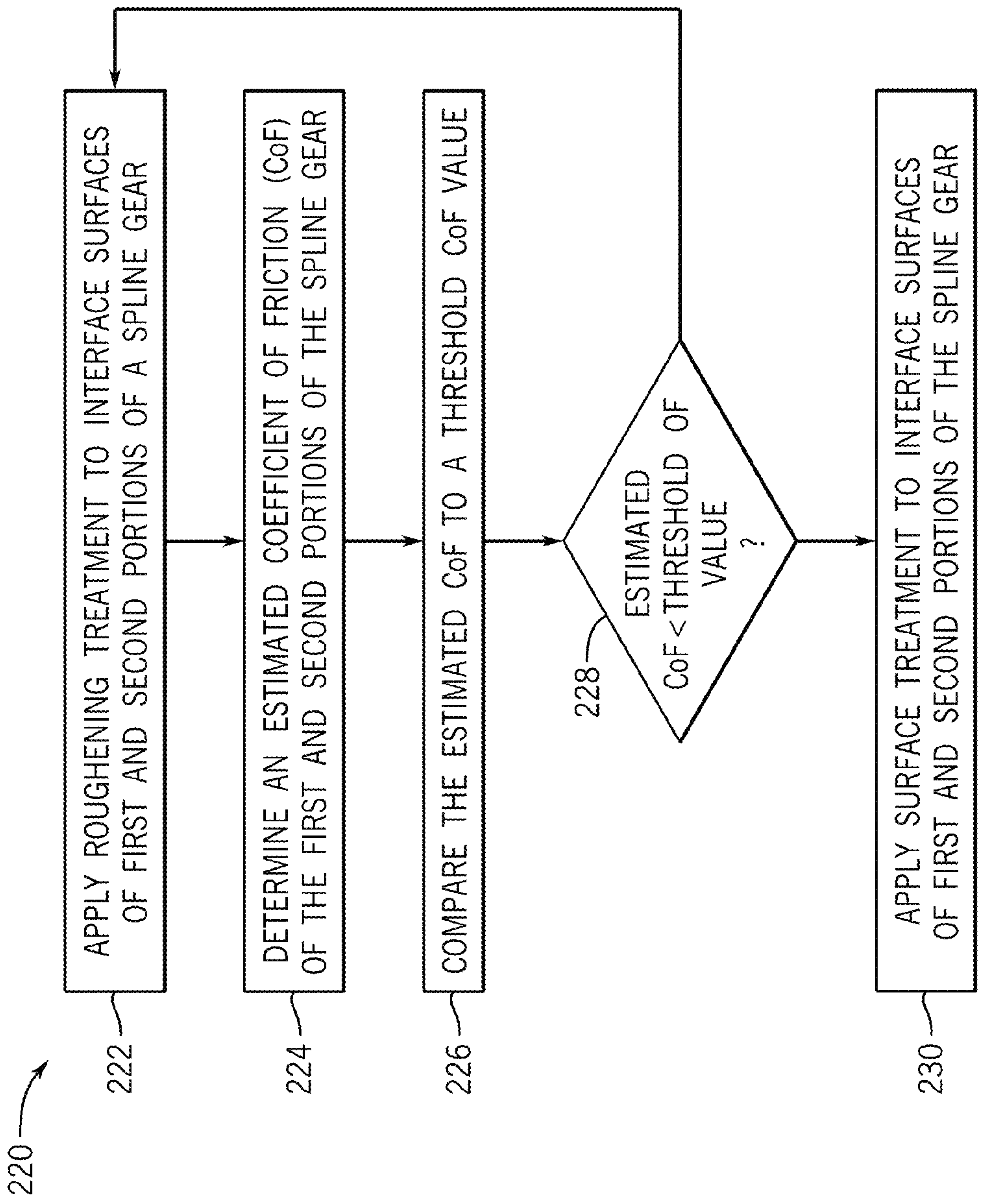
FIG. 4 is a flow chart of an embodiment of a process for treating a surface of the spline gear.

FIG. 4 is a flow chart of an embodiment of a process 220 for treating the surface 161 of the spline gear 57. The blocks of the process 220 may be performed in the order disclosed herein or in any other suitable order. For example, certain blocks of the process 220 may be performed concurrently. In addition, in certain embodiments, at least one of the blocks of the process 220 may be omitted.

In block 222 of the process 220, a roughening treatment is applied to the surfaces 161 (e.g., surfaces 162, 164) of the gear portions 150 (e.g., inner gear portion 152, outer gear portion 154). For example, the roughening treatment may include a shot peening treatment, a laser shock peening treatment, or a combination thereof. In certain embodiments, the roughening treatment may be applied to the surfaces of the gear portions 150 that interface with each other. For example, the roughening treatment may be applied to the plurality of inner teeth 158 and/or the plurality of outer teeth 160.

In block 224 of the process 220, an estimated coefficient of friction (COF) between the roughened surfaces 161 of the gear portions 150 is determined. For example, the COF may be determined at least in part based on using a tribometer and/or measuring one or more performance metrics of the spline gear 57 having the applied roughening treatment during an operation of the spline gear 57.

In block 226 of the process 220, the estimated COF is compared with a threshold COF value. In certain embodiments, the threshold COF value may fall between 0.1 and 0.3, 0.15 and 0.25, or 0.18 and 0.22. In certain embodiments, the threshold COF value is approximately 0.2. In block 228 of the process 220, a determination is made as to whether the estimated COF is smaller than the threshold COF value. If the estimated COF is greater than or equal to the threshold COF value, then the process 220 may return to block 222 for additional roughening treatment.

In block 230 of the process 220, if the estimated COF is less than the threshold COF value, then a surface treatment is applied to the surfaces 161 of the gear portions 150 of the spline gear 57. In certain embodiments, the surface treatment may include a nitriding treatment, a carburizing treatment, a carbonitriding treatment, or a combination thereof. In certain embodiments, the surfaces 162 and 164 may receive the same type of surface treatment. In certain embodiments, the surfaces 162 and 164 may receive different surface treatments. For example, the surfaces 162 may receive a nitriding treatment and the surfaces 164 may receive a carburizing treatment. In certain embodiments, the surfaces 162 may receive a surface treatment and the surfaces 164 may not receive a surface treatment.

The process 220 may be performed for any moving parts or wear parts of machinery, such as turbomachines (e.g., turbines, compressors, pumps, etc.), motors, generators, transmissions, clutches, and various rotary machines. The process 220 may control various aspects of the roughening treatment to reduce the coefficient of friction and increase the wear resistance of the parts. For example, the process 220 may control a shot size of media, a type of media, a material of media, a fluid pressure used to drive the media, a shot velocity of the media, a peening angle of media applied onto the surface, a coverage area, an intensity of the shot peening, and a time duration of the shot peening.

The technical effects of the disclosed embodiments enable the operation of flexible spline gear (e.g., spline gears, spline clutches) to operate at conditions for which the coefficient of friction between first and second portions of the spline gear is lowered below a threshold coefficient of friction. The lowered coefficient of friction may reduce a contact area between the gear portions, thereby mitigating the likelihood of wear and/or galling on the flexible spline gear, as well as mitigation of unacceptable loads being generated between the gas turbine engine and the steam turbine engine.

The subject matter described in detail above may be defined by one or more clauses, as set forth below.

According to a first aspect, a system includes a turbine and a spline gear coupled to the turbine. The spline gear includes first and second gear portions. The first gear portion includes a first surface configured to engage a second surface of the second gear portion. The first surface includes a first roughened surface having a plurality of first treatment zones distributed in two dimensions. A post-treatment coefficient of friction (COF) between the first and second surfaces is less than a threshold COF value.

The system of the preceding clause, wherein the second surface includes a second roughened surface having a plurality of second treatment zones distributed in two dimensions.

The system of any preceding clause, wherein the plurality of first treatment zones includes a plurality of first compression zones.

The system of any preceding clause, wherein the plurality of first compression zones includes a plurality of first indentations.

The system of any preceding clause, wherein the plurality of first compression zones includes a plurality of first compressive residual stress zones.

The system of any preceding clause, wherein the plurality of first compression zones includes a plurality of shot peening indentations, a plurality of laser shock peening residual stresses, or a combination thereof.

The system of any preceding clause, wherein the second surface includes a first surface treatment including a nitriding treatment, a carburizing treatment, a carbonitriding treatment, or a combination thereof.

The system of any preceding clause, wherein at least one of the first surface or the second surface includes a plurality of capillaries configured to retain a lubricant.

The system of any preceding clause, wherein the threshold COF value is between 0.15 and 0.25.

The system of any preceding clause, wherein the threshold COF value is between 0.18 and 0.22.

The system of any preceding clause, wherein the first and second surfaces are disposed along a sliding interface between the first and second gear portions of the spline gear.

The system of any preceding clause, wherein the spline gear includes a spline clutch, a rotary coupling, or a combination thereof.

The system of any preceding clause, wherein the turbine includes a gas turbine, a steam turbine, or a combination thereof.

According to a second aspect, a system includes a spline gear. The spline gear includes a first gear portion and a second gear portion configured to engage the first gear portion. The first gear portion includes a first surface configured to engage a second surface of the second gear portion. The first surface includes a first roughened surface having a plurality of first treatment zones distributed in two dimensions. A post-treatment coefficient of friction (COF) between the first and second surfaces is less than a threshold COF value.

The system of the preceding clause, wherein the plurality of first treatment zones includes a plurality of first compression zones.

The system of any preceding clause, wherein the plurality of first compression zones includes a plurality of first indentations, a plurality of first compressive residual stress zones, or a combination thereof.

The system of any preceding clause, wherein the threshold COF value is between 0.18 and 0.22.

According to a third aspect, a method includes applying a first roughening treatment to a first surface of a first gear portion of a spline gear to form a first roughened surface. The first surface of the first gear portion is configured to engage a second surface of a second gear portion of the spline gear. The first roughened surface includes a plurality of first treatment zones distributed in two dimensions. A post-treatment coefficient of friction (COF) between the first and second surfaces is less than a threshold COF value.

The method of the preceding clause, including applying a second roughening treatment to the second surface of the second gear portion to form a second roughened surface, wherein the second roughened surface includes a plurality of second treatment zones distributed in two dimensions.

The method of any preceding clause, wherein applying the first roughening treatment includes at least one of: shot peening or grit blasting the first surface with media to form the plurality of first treatment zones, wherein the plurality of first treatment zones includes a plurality of shot peening indentations; or laser shock peening the first surface to form the plurality of first treatment zones, wherein the plurality of first treatment zones includes a plurality of laser shock peening residual stresses.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:

a turbine; and a spline gear coupled to the turbine, wherein the spline gear comprises first and second gear portions, and the first gear portion is concentric with the second gear portion;

wherein the first gear portion comprises a first surface configured to directly engage a second surface of the second gear portion at an interface, the first and second surfaces comprise a plurality of dimples, and the plurality of dimples result in a coefficient of friction (COF) at the interface between the first and second surfaces being a COF value of less than or equal to 0.25.

2. The system of claim 1, wherein the plurality of dimples comprises a plurality of shot peening indentations, a plurality of laser shock peening residual stresses, or a combination thereof.

3. The system of claim 1, wherein the second surface comprises a surface treatment comprising a nitriding treatment, a carburizing treatment, a carbonitriding treatment, or a combination thereof.

4. The system of claim 1, wherein at least one of the first surface or the second surface comprises a plurality of capillaries configured to retain a lubricant, and the plurality of capillaries define a spongy surface having a plurality of channels, holes, or recesses.

5. The system of claim 1, wherein the COF value is between 0.15 and 0.25.

6. The system of claim 1, wherein the COF value is between 0.18 and 0.22.

7. The system of claim 1, wherein the interface between the first and second surfaces is a sliding interface between the first and second gear portions of the spline gear.

8. The system of claim 7, wherein the spline gear comprises a spline clutch having the sliding interface.

9. The system of claim 1, wherein the turbine comprises a gas turbine, a steam turbine, or a combination thereof.

10. The system of claim 1, wherein the second surface comprises a portion of the second gear portion that directly engages the first gear portion, and the second surface does not comprise an additional portion of the second gear portion that does not engage the first gear portion.

11. A system, comprising:

a spline gear, comprising:

a first gear portion; and a second gear portion configured to engage the first gear portion, wherein the second gear portion is concentric with the first gear portion;

wherein the first gear portion comprises a first surface configured to directly engage a second surface of the second gear portion at an interface, the first and second surfaces comprise a plurality of dimples, and the plurality of dimples result in a coefficient of friction (COF) at the interface between the first and second surfaces being a COF value of less than or equal to 0.25.

12. The system of claim 11, wherein the COF value is between 0.18 and 0.22.

13. The system of claim 11, wherein the plurality of dimples comprises a plurality of laser shock peening residual stresses.

14. The system of claim 11, wherein at least one of the first surface or the second surface comprises a plurality of capillaries configured to retain a lubricant.

15. The system of claim 11, wherein the first and second surfaces comprises a surface treatment comprising a nitriding treatment, a carburizing treatment, a carbonitriding treatment, or a combination thereof.

16. The system of claim 15, wherein the first and second surfaces are comprised of a metal.

17. A method, comprising:

applying a first roughening treatment to a first surface of a first gear portion of a spline gear to form a plurality of first dimples in the first surface, wherein the first surface of the first gear portion is configured to directly engage a second surface of a second gear portion of the spline gear at an interface, wherein the first gear portion is concentric with the second gear portion, and the plurality of first dimples result in a coefficient of friction (COF) at the interface between the first and second surfaces being a COF value of less than or equal to 0.25.

18. The method of claim 17, comprising:

applying a second roughening treatment to the second surface of the second gear portion to form a plurality of second dimples in the second surface.

19. The method of claim 18, wherein the plurality of first dimples comprises a plurality of shot peening indentations, and the plurality of second dimples comprises a plurality of laser shock peening indentations.

20. The method of claim 17, wherein applying the first roughening treatment comprises at least one of:

shot peening or grit blasting the first surface with media to form the plurality of first dimples, wherein the plurality of first dimples comprises a plurality of shot peening indentations; or laser shock peening the first surface to form the plurality of first dimples, wherein the plurality of first dimples comprises a plurality of laser shock peening residual stresses.

* * * * *